(12) United States Patent
Aharoni et al.

(10) Patent No.: US 12,263,747 B2
(45) Date of Patent: Apr. 1, 2025

(54) ELECTRICAL COMMUNICATION SYSTEM FOR UNMANNED AERIAL VEHICLE

(71) Applicant: STRIX DRONES LTD, Neve Yarak (IL)

(72) Inventors: Niv Aharoni, Neve Yarak (IL); Maoz Klein, Tel Aviv (IL)

(*) Notice: Subject to any disclaimer, the term of this patent is extended or adjusted under 35 U.S.C. 154(b) by 487 days.

(21) Appl. No.: 17/700,538

(22) Filed: Mar. 22, 2022

(65) Prior Publication Data

US 2023/0302933 A1  Sep. 28, 2023

(51) Int. Cl.
| | |
|---|---|
| *B60L 53/35* | (2019.01) |
| *B60L 53/10* | (2019.01) |
| *B64U 50/37* | (2023.01) |
| *B64U 60/50* | (2023.01) |
| *B64U 10/13* | (2023.01) |
| *B64U 80/25* | (2023.01) |
| *B64U 101/00* | (2023.01) |

(52) U.S. Cl.
CPC ............. *B60L 53/35* (2019.02); *B60L 53/10* (2019.02); *B64U 50/37* (2023.01); *B64U 60/50* (2023.01); *B64U 10/13* (2023.01); *B64U 80/25* (2023.01); *B64U 2101/00* (2023.01)

(58) Field of Classification Search
CPC ........ B60L 53/35; B60L 53/10; B64C 39/024; B64C 39/02; B64U 2101/10; B64U 50/34
See application file for complete search history.

(56) References Cited

U.S. PATENT DOCUMENTS

| | | | |
|---|---|---|---|
| 11,111,033 B1* | 9/2021 | Burks | B64U 50/34 |
| 2016/0259374 A1* | 9/2016 | Breiwa | H01F 7/0247 |
| 2018/0237161 A1* | 8/2018 | Minnick | B60L 53/14 |

OTHER PUBLICATIONS

Zhang Bo, et al. "A Valve Pipe Leakage Detecting Device," CN 111122065, May 8, 2020 (Year: 2020).*
Liu, Tian-Iun et al., "A new-type Device Conductive Mechanism," CN 212307638, Jan. 8, 2021 (Year: 2021).*

* cited by examiner

*Primary Examiner* — Woody A Lee, Jr.
*Assistant Examiner* — Joshua R Beebe

(57) ABSTRACT

An electrical communication system for unmanned aerial vehicle that includes conductive contact surfaces with magnets that are attached to a landing platform, and conductive pin systems that are attached to the vehicle. Each conductive pin system includes a conductive pin that its lower end is made of a magnetizing material, and its upper end is connected to the controller and the battery of the vehicle. The conductive pin systems includes a main body, that is attached to the vehicle, with a hole inside which the conductive pin is penetrated, a nut assembled on the upper end of the pin, a spring that is wounded on the pin between the nut and the main body so that the spring pushes upwards the pin, and a cable connector that is connected to the upper end of the pin to enable electrical connection with the controller and the battery.

2 Claims, 2 Drawing Sheets ic COMMUNICATION SYSTEM
ELECTRICAL COMMUNICATION SYSTEM FOR UNMANNED AERIAL VEHICLE

TECHNICAL FIELD

The present invention relates to an electric communication system for communicating and charging an unmanned aerial vehicle.

PRIOR ART

The use of unmanned aerial vehicles is increasing from time to time, that requires innovations and solutions for charging and communication between the unmanned aerial vehicle and their landing platforms or their docking stations. The present invention discloses and good and efficient solution for these needs.

THE INVENTION

Figure 1:
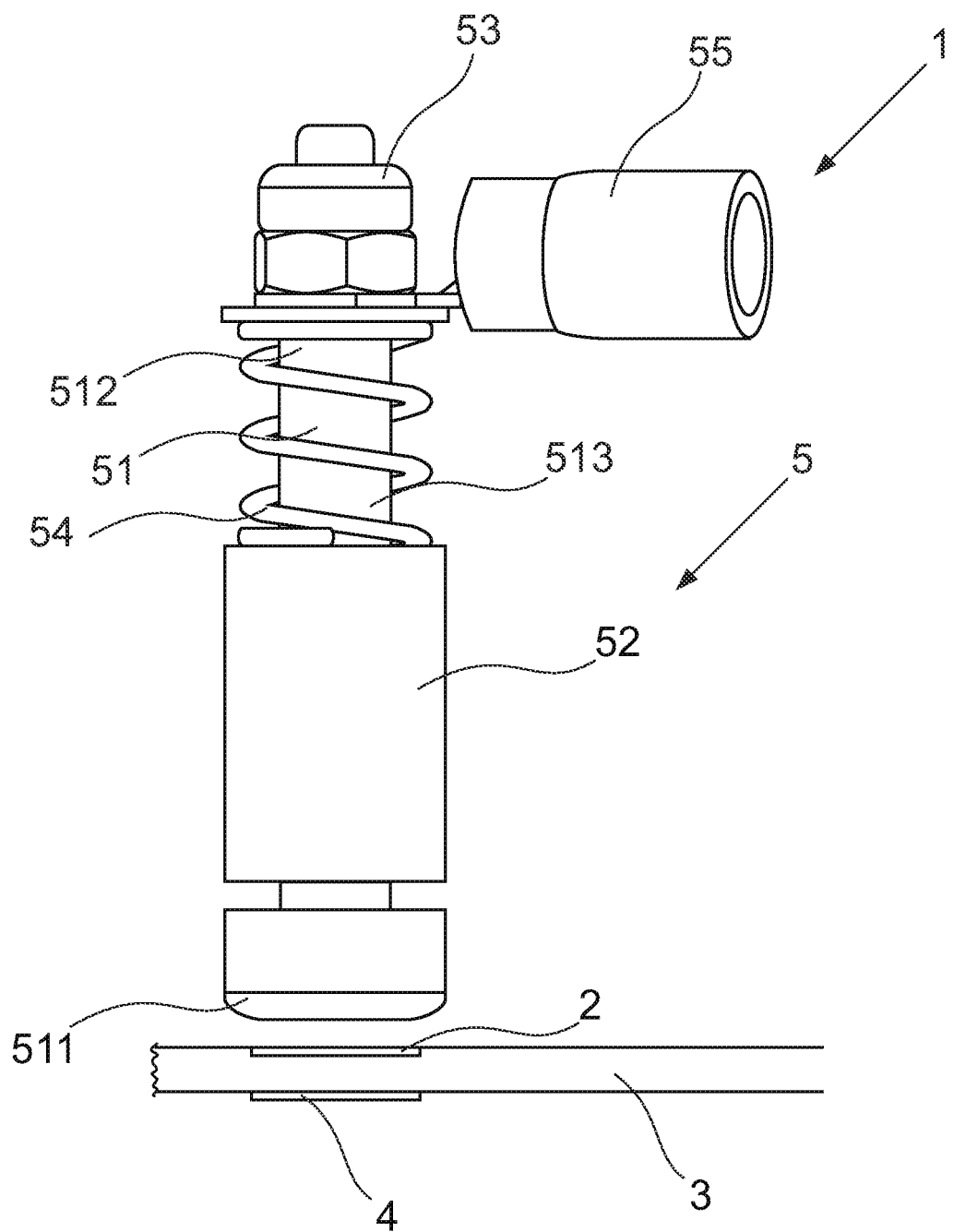
FIG. 1 depicts schematically the system (1).

The main objective of the present invention is to provide an electrical communication system (1) for charging the battery of an unmanned aerial vehicle (100) and for communicating with the vehicle.

The system includes plurality of conductive contact surfaces (2) that are designed to be attached to a landing platform (3) or that form part of the landing platform, plurality of magnets (4) that arte designed to be attached under the conductive contact surfaces or forming part of that conductive contact surfaces, and plurality of conductive pin systems (5) that are designed to be attached to the vehicle.

Each conductive pin system includes a conductive pin (51) that at least its lower end (511) is made of a magnetizing material, and its upper end (512) is designed to be connected electrically to the controller (101) and to a battery (102) of the vehicle. It is possible that the conductive pins will be made fully of magnetizing material or only their lower ends, for the reason explained below.

The system is designed to serve for charging the battery and for electrical connection with the controller. When the conductive pins are in contact with the conductive contact surfaces the magnetic force/the magnetic field of the plurality of magnets can increase continuity of the electrical connection between the conductive pins and the conductive contact surfaces. Such electrical connection is needed for example for uploading or downloading data to and from the controller and for charging the battery.

The conductive pin systems (5) of system may include a main body (52) that is designed to be attached to the unmanned aerial vehicle; the main body includes a hole (521) along its length inside which one of the conductive pins (51) is penetrated. The main body may be for example a bearing or a short pipe or a sleeve. The conductive pin of each conductive pin systems is penetrated through the hole, and extend from up and from down of that hole.

The conductive pin systems (5) of system may include a nut (53) that is assembled on the upper end (512) of the conductive pin. The term nut means an ordinary nut or a hat or any part that can be screwed or worn or assembled on the edge or top of the conductive pin.

The conductive pin systems (5) of system may include a spring (54) that wound on a section (513) of the conductive pin between the nut and the main body so that the spring can push upwards the conductive pin. In that way, the conductive pins do not touch the ground or the landing platform but only when they are positioned over the contact surfaces when the magnets attract them downward.

The conductive pin systems (5) of system may include a cable connector (55) that is designed to be connected to the upper end of the conductive pin and that is designed to enable the electrical connection with the controller and the battery. It is possible to use a socket that its edge is connected to the conductive pin and the user can insert a pin with cable for connecting it to the controller of the vehicle.

When the conductive pins are above the contact surfaces, the magnets attracts the conductive pins and pull them downwards to touch the contact surfaces and by that create the electrical connection between the conductive pins and the contact surfaces. It is clear that the magnetic attraction power of the magnet on the conductive pin is greater that the power of the spring that push the pin upwards.

The present invention also provides a method for increasing continuity of the electrical connection between the plurality of conductive pins and the plurality of conductive contact surfaces. Such electrical connection is needed for charging the battery of the unmanned aerial vehicle and for electrical communication with the controller of the vehicle. The method includes the following septs: installing the plurality of conductive pin systems on the unmanned aerial vehicle, installing the plurality of conductive contact surfaces and the plurality of magnets on the landing platform, and positioning the conductive pins above the contact surfaces.

Figure 2:
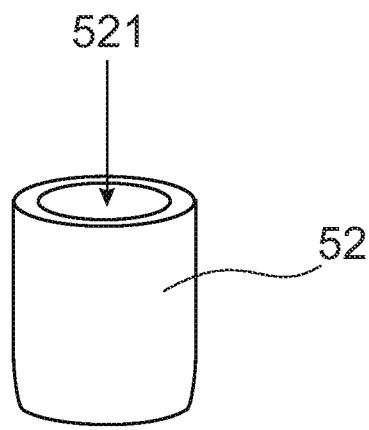
FIG. 2 depicts the main body (52).
Figure 3:
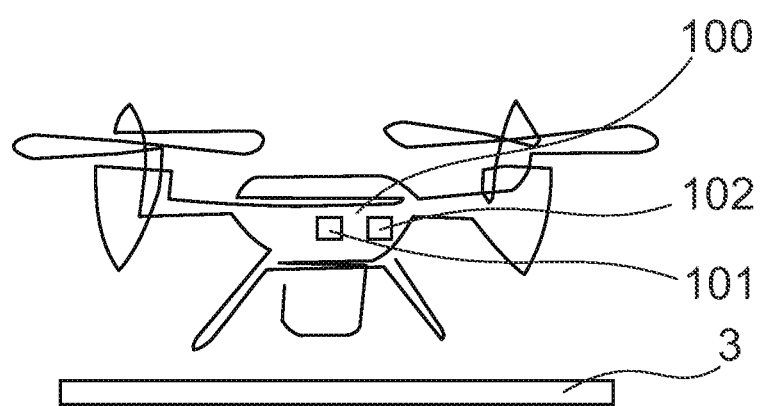
FIG. 3 depicts schematically the landing platform and the unmanned aerial vehicle.

FIG. 1 depicts schematically the system (1), FIG. 2 depicts the main body (52), and FIG. 3 depicts schematically the landing platform and the unmanned aerial vehicle.

The system subject of the present invention provides a solution to a variety of problems. First, it enables continuity in the electronic connection of the battery and the computer of the unmanned aerial vehicle with the charging system and control center connected to the docking station. In addition, since the conductive pins are pulled upwards (by the spring) they do not touch the ground or the landing surface/docking station, and do not touch or hit other systems. The conductive pins touch the conductive contact surfaces only when they are in the right place over that contact surfaces. It is understood from the above explanations that the upward force exerted by the spring on the pins is smaller than the downward magnetic attraction that the magnet exerts on the pins, and therefore the pins move down when they are over the conductive contact surfaces.

What is claimed is:

1. An electrical communication system for an unmanned aerial vehicle (UAV), comprising:
   a plurality of conductive contact surfaces, designed to be attached to or form part of a landing platform,
   a plurality of magnets designed to be attached under the conductive contact surfaces or integrated into the conductive contact surfaces,
   a plurality of conductive pin systems designed to be mounted on the UAV;
   wherein each conductive pin system comprises a conductive pin having a lower end is made of magnetized material, and an upper end designed to be electrically connected to a controller and a battery of the UAV; a main body designed to be attached to the UAV; a spring, arranged to bias the conductive pin upwards;

and a cable connector, coupled to the upper end of the conductive pin, facilitating electrical connection to the controller and the battery:

wherein the system is designed to serve for charging the battery and for electrical connection with the controller;

wherein when the conductive pins are in contact with the conductive contact surfaces, a magnetic force generated by the magnets enhances continuity of the electrical connection between the conductive pins and the conductive contact surfaces; and wherein when the conductive pin is above the contact surface, the magnet configured to exert a pulling force on the conductive pin, urging it downwards to establish an electrical connection between the conductive pin and the conductive contact surface.

2. A method for enhancing a continuity of an electrical connection between a plurality of conductive pins and a plurality of conductive contact surfaces for charging a battery of an unmanned aerial vehicle (UAV) and facilitating electrical communication with the UAV, the method comprising:

installing the electrical communication system of claim 1, wherein the plurality of conductive pin systems is mounted on the UAV; and the plurality of conductive contact surfaces, along with the associated magnets, is attached to or integrated into a landing platform.

* * * * *